(12) United States Patent
Jordy et al.

(10) Patent No.: US 9,722,244 B2
(45) Date of Patent: Aug. 1, 2017

(54) POSITIVE ELECTRODE MATERIAL FOR LITHIUM-ION BATTERY

(71) Applicants: SAFT, Bagnolet (FR); UMICORE, Brussels (BE)

(72) Inventors: Christian Jordy, St Louis de Monteferrand (FR); Georges Caillon, Bruges (FR); Thierry Hezeque, Aubie Espessas (FR); Stephane Levasseur, Brussels (BE); Nina V. Kosova, Novosibirsk (RU); Evgeniya T. Devyatkina, Novosibirsk (RU)

(73) Assignees: SAFT, Bagnolet (FR); UMICORE, Brussels (BE)

( * ) Notice: Subject to any disclaimer, the term of this patent is extended or adjusted under 35 U.S.C. 154(b) by 159 days.

(21) Appl. No.: 14/427,495

(22) PCT Filed: Sep. 11, 2013

(86) PCT No.: PCT/EP2013/068835
§ 371 (c)(1),
(2) Date: Mar. 11, 2015

(87) PCT Pub. No.: WO2014/041029
PCT Pub. Date: Mar. 20, 2014

(65) Prior Publication Data
US 2015/0214547 A1    Jul. 30, 2015

(30) Foreign Application Priority Data

Sep. 13, 2012 (FR) ..................... 12 58615

(51) Int. Cl.
*H01B 1/08* (2006.01)
*H01M 4/505* (2010.01)
(Continued)

(52) U.S. Cl.
CPC ........ *H01M 4/505* (2013.01); *C01G 45/1221* (2013.01); *C01G 45/1285* (2013.01);
(Continued)

(58) Field of Classification Search
CPC ...... H01M 4/505; H01M 4/485; H01M 4/525; H01M 4/587; H01M 10/0525; H01M 4/36;
(Continued)

(56) References Cited

U.S. PATENT DOCUMENTS 6,458,487 B1   10/2002  Takeuchi et al.
2009/0220860 A1*  9/2009  Xi .......................... C01G 30/00
                                                            429/220

(Continued)

FOREIGN PATENT DOCUMENTS

JP     2009-059656 A      3/2009
JP     2013187032 A  *   9/2013

OTHER PUBLICATIONS

International Search Report of PCT/EP2013/068835 dated Dec. 17, 2013.

(Continued)

*Primary Examiner* — Mark Kopec
*Assistant Examiner* — Jaison Thomas
(74) *Attorney, Agent, or Firm* — Sughrue Mion, PLLC (57) ABSTRACT

A compound of formula $Li_{4+x}MnM^1_aM^2_bO_c$ wherein:
$M^1$ is selected from the group consisting in Ni, Mn, Co, Fe and a mixture thereof;
$M^2$ is selected from the group consisting in Si, Ti, Mo, B, Al and a mixture thereof;
with:
$-1.2 \leq x \leq 3$;
$0 < a \leq 2.5$;
$0 \leq b \leq 1.5$;

(Continued)

Capacity of the battery with format 18650 (mAh)

Volume capacity (mAh/cm³)

$4.3 \leq c \leq 10$; and
$c = 4 + a + n \cdot b + x/2$
wherein
$n=2$ when $M^2$ is selected from the group consisting in Si, Ti, Mo or a mixture thereof; and
$n=1.5$ when $M^2$ is selected from the group consisting in B, Al or a mixture thereof; and
$n=0$ if $b=0$.

9 Claims, 3 Drawing Sheets (51) Int. Cl.
| | |
|---|---|
| C01G 45/12 | (2006.01) |
| C01G 51/00 | (2006.01) |
| C01G 53/00 | (2006.01) |
| H01M 10/0525 | (2010.01) |
| H01M 4/36 | (2006.01) |
| H01M 4/38 | (2006.01) |
| H01M 4/525 | (2010.01) |
| H01M 4/587 | (2010.01) |
| H01M 4/485 | (2010.01) |
| H01M 4/62 | (2006.01) |

(52) U.S. Cl.
CPC ............ *C01G 51/44* (2013.01); *C01G 51/62* (2013.01); *C01G 53/44* (2013.01); *C01G 53/62* (2013.01); *H01B 1/08* (2013.01); *H01M 4/36* (2013.01); *H01M 4/386* (2013.01); *H01M 4/387* (2013.01); *H01M 4/485* (2013.01); *H01M 4/525* (2013.01); *H01M 4/587* (2013.01); *H01M 4/625* (2013.01); *H01M 10/0525* (2013.01); *C01P 2002/72* (2013.01); *C01P 2002/76* (2013.01)

(58) Field of Classification Search
CPC .. H01M 4/386; H01M 4/387; C01G 45/1221; C01G 45/1285; C01G 51/44; C01G 51/62; C01G 53/44; C01G 53/62; C01P 2002/72; C01P 2002/76
See application file for complete search history.

(56) References Cited

U.S. PATENT DOCUMENTS

| | | | | |
|---|---|---|---|---|
| 2013/0029224 | A1* | 1/2013 | Fusalba | H01M 2/26 429/220 |
| 2015/0044578 | A1* | 2/2015 | Kourtakis | H01M 4/485 429/341 |
| 2015/0340685 | A1* | 11/2015 | Theuerkauf | H01M 4/0411 427/58 |

OTHER PUBLICATIONS

International Preliminary Report on Patentability from the International Searching Authority in counterpart Application No. PCT/EP2013/068835.

\* cited by examiner

POSITIVE ELECTRODE MATERIAL FOR LITHIUM-ION BATTERY

CROSS REFERENCE TO RELATED APPLICATIONS

This is a National Stage of International Application No. PCT/EP2013/068835 filed Sep. 11, 2013, claiming priority based on French Patent Application No. 1258615 filed Sep. 13, 2012, the contents of all of which are incorporated herein by reference in their entirety.

FIELD OF THE INVENTION

The technical field of the invention is that of electrochemically active materials intended to be used in the positive electrode (or cathode) of a rechargeable electrochemical generator (or battery) of the lithium-ion type.

PRIOR ART

Lithiated oxides of transition metal are known as an electrochemically active material (or active material) which may be used in the positive electrode of lithium batteries. Most often a lithiated oxide of a transition metal of general formula $Li_xMO_2$, wherein M represents at least one transition metal, such as Mn, Ni, Co, Al or a mixture thereof, is used as an active material of the positive electrode in the discharged state. Lithium is reversibly removed from the structure of the oxide during the charging of the battery and is then re-inserted into the structure during discharging. In $LiMO_2$, M is in an oxidation degree of +3. When this oxide is subject to a high potential during the charging of the accumulator, the compound $Li_{1-n}MO_2$ is formed by removal of the lithium and release of electrons according to the following reaction:

$$LiMO_2 \rightarrow Li_{1-n}MO_2 + nLi^+ + ne^-.$$

This reaction shows that the removal of n moles of lithium is accompanied by the release of n moles of electrons. In order to observe electroneutrality of $Li_{1-n}MO_2$, the degree of oxidation of M increases to the value 3+n. When all the lithium is removed from the structure of the oxide, M is found in the degree of oxidation +4. Such an oxide can only therefore exchange one electron per metal atom M. Consequently, the maximum theoretical capacity of this type of oxide is of the order of 270 mAh/g.

As a currently used cathode active material, mention may be made of the compound $Li(Ni_{0.8}Co_{0.15}Al_{0.05})O_2$, which is a lithiated oxide of nickel-cobalt-aluminium. This compound also called NCA (nickel-cobalt-aluminium) is present in the positive electrode of lithium batteries used for industrial applications such as electric hybrid vehicles and space applications. Such an electrode material has a mass capacity limited to about 200 mAh/g and a volume capacity limited to about 880 mAh/cm³.

Figure 1:
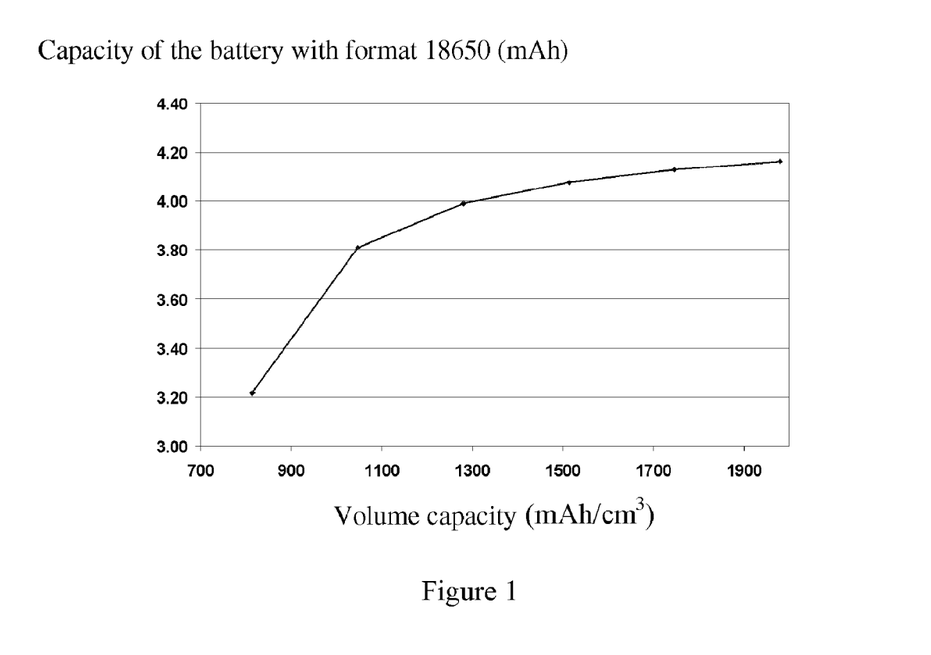
FIG. 1 illustrates the time-dependent change in the capacity (Ah) of a battery of the 18650 type versus the volume capacity of the electrochemically active material of the positive electrode. The electrochemically active material of the positive electrode is NCA. The electrochemically active material of the negative electrode is graphite.

It is known to associate a positive electrode comprising a material of the NCA type with a negative graphite electrode. The gain in capacity which may be obtained by improving the negative electrode is not expressed by a corresponding increase in the capacity of the battery when the volume capacity of the graphite exceeds 1,100 mAh/cm³ as shown in FIG. 1.

Figure 2:
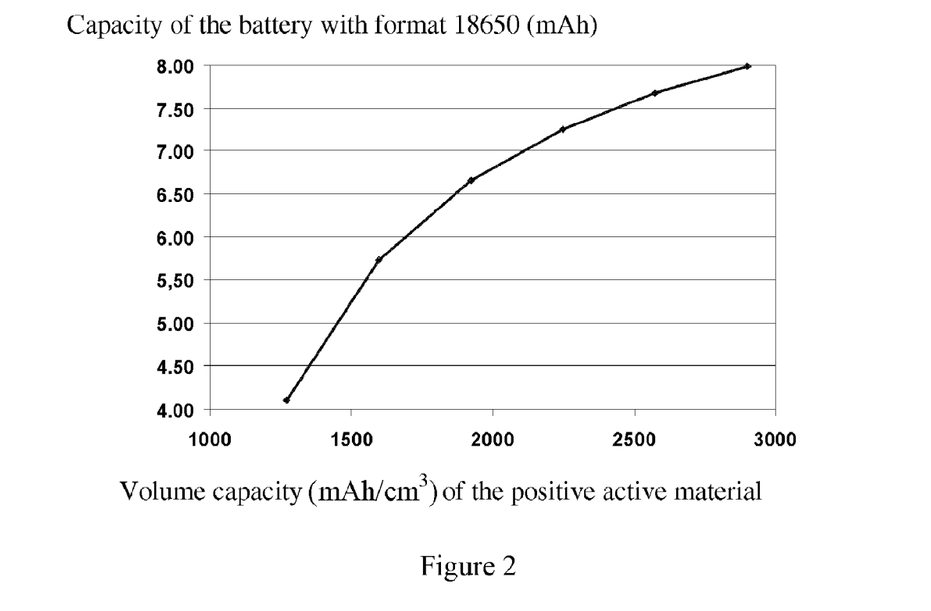
FIG. 2 illustrates the time-dependent change in the capacity (Ah) of a battery of the 18650 type versus the volume capacity of the electrochemically active material of the positive electrode. The electrochemically active material of the negative electrode is based on silicon.

The use of new anodes based on silicon, with a much higher capacity than standard graphite electrodes, associated with standard cathode active materials, such as NCA, strongly limits the potential for improving the capacity of the battery. Indeed, the mass or the volume of novel negative active materials becomes small relatively to the positive electrodes. If a negative electrode optimized in capacity is used, FIG. 2 shows that any increase in the capacity of the positive electrode is expressed by a sharp increase in the capacity of the battery.

In order to increase the theoretical capacity of the positive active material, compounds based on transition metals with the degree of oxidation +2 and containing two lithium atoms per metal atom have been investigated, such as $Li_2NiO_2$. The theoretical capacity of this type of compounds is of about 510 mAh/g. Nevertheless, the reversible capacity of this material is low (of the order of 100 mAh/g). This is due to an instability of the crystallographic structure during the first charging process as explained in document: Chang Keun Back, Ri-Zhu Yin, Se-Jong Shin, Yoon-Soo Lee, Wanuk Choi and Yang-Soo Kim, Journal of The Electrochemical Society, 159 (6) A887-A893 (2012).

Silicates and titanates with compositions $Li_2MSiO_4$ and $Li_2MTiO_4$ (with M=Fe, Mn) have been contemplated in order to associate high capacity and high voltage by the effect provided by silicon oxide or titanium oxide. Nevertheless, although the theoretical mass capacity of these materials is improved (330 mAh/g), their theoretical volume capacity is of about 1,250 mAh/cm³, which is comparable with what is obtained for a compound only exchanging one single electron per metal atom, for example $LiNiO_2$ for which the volume capacity is 1,220 mAh/cm³.

Overlithiated oxides of nickel, manganese and cobalt have also been investigated. Their formula may be written as $Li_{1+y}M_{1-y}O_2$ or further $xLi_2MnO_3,(1-x)LiMO_2$ wherein M is essentially selected from Mn, Ni, Co and Fe. For these materials, a portion of the manganese, equal to y or x has a degree of oxidation of +4, it therefore cannot exchange electrons upon charging. Only the remainder of the manganese and the other metals M, with a degree of oxidation +3 may exchange at most one electron. In reality, these materials may, during the first charging process, exchange more than one electron because of partial oxidation of the $O^{2-}$ ions of the structure. The capacity of these materials is higher than that of materials of the $LiMO_2$ type, but it is not optimized because of a too low lithium content (all in all, 1+x per formula) relatively to the theoretical number of electrons which may discharge electrochemically active elements (all in all, up to 2 per formula), except for x=1 corresponding to $Li_2MnO_3$.

For materials of the $Li_2MnO_3$ type, the amount of lithium is optimized relatively to the number of exchangeable electrons by the manganese. Nevertheless, an oxygen atom has to be totally oxidized in order to allow first charging since the manganese in $Li_2MnO_3$ is at its maximum degree of oxidation of +4 and cannot be further oxidized. This material has a theoretical mass capacity of 459 mAh/g and a theoretical volume capacity of 1,622 mAh/cm³. Further, the maximum reversible capacity is 250 mAh/g. A material is sought having greater mass and volume capacities.

Document JP 2009-274940 describes a lithiated oxide based on manganese of formula $Li_{1+x}(Mn_{(1-m-n)}Fe_mTi_n)_{(1-x)}O_2$ wherein $0<x<\frac{1}{3}$; $0\leq m\leq 0.60$; $0\leq n\leq 0.80$ and $0<m+n\leq 0.80$. The compound of example 4 of this document has the formula $Li_{1.29}(Mn_{0.9}Ti_{0.1})_{0.71}O_2$ i.e. $Li_{1.29}Mn_{0.639}Ti_{0.071}O_2$. This formula may further be written as $Li_{4.04}Mn_2Ti_{0.22}O_{6.26}$ by setting to 2 the stoichiometric coefficient of the electrochemically active element, i.e. manganese. By establishing the electroneutrality relationship of the compound, it is inferred that manganese is in the degree of oxidation +3.8. This material can only exchange 0.2 electrons per manganese atom, which is insufficient for obtaining a compound having a high electrochemical capacity. The measured capacity of this compound is 201 mAh/g.

Document KR 2009-0126962 describes a positive active material for a lithium battery comprising a compound based on manganese represented by the formula $Li_aMn_{(1-b')}M_{b'}O_{(2-c)}D_c$ and by the formula $Li_aMn_{(2-b')}M_{b'}O_{(4-c)}D_c$ with $0.90 \leq a \leq 1.1$; $0 \leq b \leq 0.5$; $0 \leq b' \leq 0.5$; $0 \leq c \leq 0.05$; M being selected from the group consisting in Al, Ni, Co, Mn, Cr, Fe, Mg, Sr, rare earths and mixtures thereof. This document describes a compound of composition $Li_{1.05}Mn_{1.85}Al_{0.1}O_4$. By establishing the electroneutrality relationship of the compound and being aware that the aluminium used is in the degree of oxidation of +3, it is inferred there from that the manganese is in the average degree of oxidation of +3.6. The manganese may oxidize up to a degree of oxidation of +4, which correspond to exchange of 0.4 electrons per manganese atom. Further, the amount of lithium in these materials is less than 1.1 lithium atom per electrochemically active atom. This is insufficient for obtaining a compound having optimized electrochemical capacity.

Document JP 2009-295290 describes a lithiated oxide based on niobium of formula $Li_xNb_{(1-y)}M_yO_2$ wherein $1 \leq x \leq 2$ and $0 \leq y \leq 0.5$; M being at least one element selected from the group consisting in V, Cr, Mn, Fe, Co, Ni, Mo and W. The compound of example 6 of this document has the formula $LiNb_{0.75}Mn_{0.25}O_2$. By applying the electroneutrality relationship, it is determined that the overall degree of oxidation of the assembly formed by the niobium and the manganese is +3. Being aware that the maximum average degree of oxidation which may be attained by the assembly formed by niobium and manganese is +4.5, it is inferred therefrom that this compound may exchange 1.5 electrons per atom of electrochemically active element. However, it can only exchange one single lithium atom; therefore, this compound will only be able to exchange a single electron, which is insufficient for obtaining a compound having high electrochemical capacity.

Therefore an electrochemically active material is sought for a positive electrode of a lithium-ion battery having both a mass capacity at least equal to 240 mAh/g and a volume capacity at least equal to 900 mAh/cm³ for discharging at room temperature carried out at a rate of C/20 wherein C designates the current corresponding to a discharge of the electrode carried out in one hour. Preferably, a mass capacity at least equal to 300 mAh/g and a volume capacity at least equal to 1,200 mAh/cm³ are sought. Still preferably, a mass capacity at least equal to 350 mAh/g and a volume capacity at least equal to 1,400 mAh/cm³ are sought.

An electrochemically active material is preferably sought having an average operating voltage of at least 2.5 V.

SUMMARY OF THE INVENTION

The first objet of the invention is a compound of formula $Li_{4+x}MnM^1_aM^2_bO_c$ wherein:
$M^1$ is selected from the group consisting in Ni, Mn, Co, Fe and a mixture thereof;
$M^2$ is selected from the group consisting in Si, Ti, Mo, B, Al and a mixture thereof;
with:
$-1.2 \leq x \leq 3$;
$0 < a \leq 2.5$;
$0 \leq b \leq 1.5$;
$4.3 \leq c \leq 10$; and
$c = 4 + a + n \cdot b + x/2$ wherein:
n=2 when $M^2$ is selected from the group consisting in Si, Ti, Mo or a mixture thereof; and
n=1.5 when $M^2$ is selected from the group consisting in B, Al or a mixture thereof; and
n=0 if b=0, which compound contains a phase for which the crystallographic structure may be refined in a cubic or lamellar structure.

The second object of the invention is a compound of formula $Li_{4+x}MnM^1_aM^2_bO_c$ wherein:
$M^1$ is selected from the group consisting in Ni, Mn, Co, Fe and a mixture thereof;
$M^2$ is selected from the group consisting in Si, Ti, Mo, B, Al and a mixture thereof;
with:
$-1.2 \leq x \leq 3$;
$0 < a \leq 2.5$;
$0 < b \leq 1.5$;
$4.3 \leq c \leq 10$; and
$c = 4 + a + n \cdot b + x/2$
wherein
n=2 when $M^2$ is selected from the group consisting in Si, Ti, Mo or a mixture thereof; and
n=1.5 when $M^2$ is selected from the group consisting in B, Al or a mixture thereof.

The second object of the invention is in particular characterized by the fact that the compound necessarily comprises at least the element $M^2$ which is selected from the group consisting in Si, Ti, Mo, B, Al or a mixture thereof.

The third object of the invention is a compound of formula $Li_{4+x}MnM^1_aM^2_bO_c$ wherein:
$M^1$ is selected from the group consisting in Ni, Mn, Co, Fe and a mixture thereof;
$M^2$ is selected from the group consisting in Si, Ti, Mo, B, Al and a mixture thereof;
with:
$-1.2 \leq x \leq 3$;
$0 < a \leq 2.5$;
$0 \leq b \leq 1.5$;
$5 < c \leq 10$; and
$c = 4 + a + n \cdot b + x/2$
wherein
n=2 when $M^2$ is selected from the group consisting in Si, Ti, Mo or a mixture thereof; and
n=1.5 when $M^2$ is selected from the group consisting in B, Al or a mixture thereof.

The third object of the invention is in particular characterized by the fact that the stoichiometric index c of the oxygen of the compound is greater than 5 and less than or equal to 10.

According to an embodiment common to the three aforementioned objects, the compound may have one or more of the following features:
$M^1$ is selected from the group consisting in Mn, Ni and Co and a mixture thereof.
$M^2$ is selected from the group consisting in Mo and Ti and a mixture thereof.
$-0.2 \leq x \leq 2$, preferably $0 < x \leq 2$;
$0.5 \leq a \leq 1$;
$c/(1+a+b+c)$ is different from 2.5;
The compound does not contain any molybdenum.

According to an embodiment common to the first and third aforementioned objects, $0 \leq b \leq 0.5$ and $M^1$ is preferably Ni.

According to an embodiment of the second aforementioned object, $0 < b \leq 0.5$.

According to an embodiment common to the first and second aforementioned objects, $5 \leq c \leq 7$.

According to an embodiment common to the first and second aforementioned objects, 5<c≤10.

According to an embodiment of the third aforementioned object, 5<c≤7.

According to an embodiment common to the first and third aforementioned objects, $M^1$ is Mn and b=0.

According to an embodiment common to the second and third aforementioned objects, the compound contains a phase for which the crystallographic structure may be refined in a cubic or lamellar structure.

A fourth object of the invention is a composite material comprising the compound which is one of the first three objects of the invention with carbon in a mass percentage of less than 20% by weight based on the weight of the composite material.

A fifth object of the invention is an electrode comprising the compound which is one of the first three objects of the invention.

A sixth object of the invention is an electrode comprising the composite material which is the fourth object of the invention.

A seventh object is a battery of the lithium-ion type comprising a positive electrode which is the fifth or sixth object of the invention.

In an embodiment, the battery comprises a negative electrode comprising an active material capable of inserting lithium into its structure, said active material being selected from the group consisting in carbon, tin, silicon, compounds based on carbon and on silicon, compounds based on carbon and tin, compounds based on carbon, tin and silicon and a lithium titanate, such as $Li_4Ti_5O_{12}$.

An eighth object of the invention is a method for making a compound as described hereinbefore, said method comprising the steps:
  a) forming the compound by mechanosynthesis;
  b) annealing the compound at a temperature of less than 700° C.

A ninth object of the invention is a method for making the composite material as described herein before, said method comprising the steps:
  a) forming the compound by mechanosynthesis;
  b) adding carbon to the compound;
  c) milling the mixture comprising the carbon and the compound in order to form the composite material;
  d) optionally annealing the composite material at a temperature of less than or equal to 700° C.

According to an embodiment common to the eighth and ninth object of the invention, annealing is carried out at a temperature comprised between 350 and 450° C., preferably at a temperature of about 400° C.

DISCUSSION OF EMBODIMENTS

The first object of the invention is a compound of formula $Li_{4+x}MnM^1_aM^2_bO_c$ wherein:
  $M^1$ is selected from the group consisting in Ni, Mn, Co, Fe and a mixture thereof;
  $M^2$ is selected from the group consisting in Si, Ti, Mo, B, Al and a mixture thereof;
with:
  $-1.2 \leq x \leq 3$; with preferably $-0.2 \leq x \leq 2$; still preferably $0 < x \leq 2$;
  $0 < a \leq 2.5$; with preferably $0.5 \leq a \leq 1$;
  $0 \leq b \leq 1.5$; with preferably $0 \leq b \leq 0.5$;
  $4.3 \leq c \leq 10$; with preferably $5 \leq c \leq 7$; and
  $c = 4 + a + n \cdot b + x/2$
wherein:
  n=2 when $M^2$ is selected from the group consisting in Si, Ti, Mo or a mixture thereof; and
  n=1.5 when $M^2$ is selected from the group consisting in B, Al or a mixture thereof; characterized in that said compound contains a phase for which the crystallographic structure may be refined in a cubic or lamellar structure. The presence of a phase which crystallizes in the cubic or lamellar system allows increase in the capacity of the material as compared with compounds of orthorhombic structure.

$M^1$ is electrochemically active. The elements Ni, Mn, Co, Fe exist with the degree of oxidation +2. They oxidize to the degree of oxidation +4 when they are subject to a sufficiently high potential during the charging of the positive electrode. They are therefore capable of exchanging at least 2 electrons. For example it is possible to use as precursors the compounds MnO, NiO, CoO, or FeO, their associated hydroxides. In a preferred embodiment, $M^1$ is selected from the group consisting in Mn, Ni and Co and a mixture thereof.

In a preferred embodiment, $M^1$ is Ni and $0 \leq b \leq 0.5$.

In a preferred embodiment, $M^1$ is Mn and b=0.

In a preferred embodiment, 5<c≤10.

In a preferred embodiment, $M^1$ does not contain any Mo.

$M^2$ is selected from the group consisting in Si, Ti, Mo, B and Al. The presence of $M^2$ may for example allow an increase in the operating voltage of the compound. $M^2$ may be incorporated to the compound via a precursor such as $B_2O_3$, $Al_2O_3$, $SiO_2$, $TiO_2$, $MoO_2$. It is also possible to use molybdenum with the degree of oxidation +3 or +4. The molybdenum with the degree of oxidation of +3 is obtained by mixing molybdenum metal $Mo^o$ with molybdenum oxide $MoO_2$ in a molar ratio $MoO_2/Mo^o$ equal to 3. The molybdenum with the degree of oxidation of +4 is found in the form of pure $MoO_2$. The molybdenum may pass to the degree of oxidation +6 during the charging of the electrode. It therefore exchanges 2 or 3 electrons depending on its initial degree of oxidation. The elements Si and Ti are not electrochemically active and remain at their maximum degree of oxidation of +4 during the charging.

In a preferred embodiment, $M^2$ is selected from the group consisting in Mo and Ti and a mixture thereof.

The second object of the invention is a compound of formula $Li_{4+x}MnM^1_aM^2_bO_c$ wherein:

$M^1$ is selected from the group consisting in Ni, Mn, Co, Fe and a mixture thereof;

$M^2$ is selected from the group consisting in Si, Ti, Mo, B, Al and a mixture thereof;

with:

−1.2≤x≤3; with preferably −0.2≤x≤2; still preferably 0<x≤2;

0<a≤2.5; with preferably 0.5≤a≤1;

0≤b≤1.5; with preferably 0<b≤0.5;

4.3≤c≤10; with preferably 5≤c≤7; and c=4+a+n·b+x/2 wherein:

n=2 when $M^2$ is selected from the group consisting in Si, Ti, Mo or a mixture thereof; and n=1.5 when $M^2$ is selected from the group consisting in B, Al or a mixture thereof;

The second object of the invention is in particular characterized by the fact that the compound necessarily comprises at least the element $M^2$ selected from the group consisting in Si, Ti, Mo, B, Al or a mixture thereof. The presence of $M^2$ allows an increase in the operating voltage of the compound and also allows an increase in the thermal stability of the material in the charged condition.

In a preferred embodiment, $M^1$ is selected from the group consisting in Mn, Ni and Co and a mixture thereof.

In a preferred embodiment, $M^1$ does not contain any Mo.

In a preferred embodiment, $M^2$ is selected from the group consisting in Mo and Ti and a mixture thereof.

In a preferred embodiment, said compound contains a phase for which the crystallographic structure may be refined in a cubic or lamellar structure.

The third object of the invention is a compound of formula $Li_{4+x}MnM^1_aM^2_bO_c$ wherein:

$M^1$ is selected from the group consisting in Ni, Mn, Co, Fe and a mixture thereof;

$M^2$ is selected from the group consisting in Si, Ti, Mo, B, Al and a mixture thereof;

with:

−1.2≤x≤3; with preferably −0.2≤x≤2; still preferably 0<x≤2;

0<a≤2.5; with preferably 0.5≤a≤1;

0≤b≤1.5; with preferably 0<b≤0.5;

5<c≤10; with preferably 5≤c≤7 and c=4+a+n·b+x/2 wherein:

n=2 when $M^2$ is selected from the group consisting in Si, Ti, Mo or a mixture thereof; and n=1.5 when $M^2$ is selected from the group consisting in B, Al or a mixture thereof.

The third object of the invention is in particular characterized by the fact that the stoichiometric index c of oxygen is greater than 5 and less than or equal to 10.

In a preferred embodiment, $M^1$ is selected from the group consisting in Mn, Ni and Co and a mixture thereof.

In a preferred embodiment, $M^1$ is Ni and 0≤b≤0.5.

In a preferred embodiment, $M^1$ is Mn and b=0.

In a preferred embodiment, $M^1$ does not contain any Mo.

In a preferred embodiment, $M^2$ is selected from the group consisting in Mo and Ti and a mixture thereof.

A compound of formula $Li_{4+x}MnM^1_aM^2_bO_c$ is also described wherein:

$M^1$ is selected from the group consisting in Ni, Mn, Co, Fe and a mixture thereof;

$M^2$ is selected from the group consisting in Si, Ti, Mo, B, Al and a mixture thereof;

with:

0<x≤3; still preferably 0<x≤2;

0<a≤2.5; with preferably 0.5≤a≤1;

0≤b≤1.5; with preferably 0≤b≤0.5;

4.3≤c≤10; with preferably 5≤c≤7; and c=4+a+n·b+x/2 wherein:

n=2 when $M^2$ is selected from the group consisting in Si, Ti, Mo or a mixture thereof; and n=1.5 when $M^2$ is selected from the group consisting in B, Al or a mixture thereof;

In a preferred embodiment, $M^1$ is selected from the group consisting in Mn, Ni and Co and a mixture thereof.

In a preferred embodiment, $M^1$ is Ni and 0≤b≤0.5.

In a preferred embodiment, $M^1$ is Mn and b=0.

In a preferred embodiment, 5<c≤10.

In a preferred embodiment, $M^1$ does not contain any Mo.

Table 1 below summarizes the oxidation states of the elements Mn, $M^1$ and $M^2$ for a compound in the discharged condition, before the first charging, and in the charged condition as well as the number of exchangeable electrons per element. By number of exchangeable electrons, is meant the theoretical number of electrons which an electrochemically active element may lose (respectively gain) during the charging (respectively the discharging) of an electrode containing the compound according to the invention. The number of exchangeable electrons per element is equal to the difference between the degree of oxidation of the element in the relevant compound during the mounting of the battery, and the degree of oxidation of the element when the electrode is in the charged condition.

TABLE 1

|  | Initial degree of oxidation before the first charging process | Degree of oxidation in the charged condition | Number of exchangeable electrons |
|---|---|---|---|
| Mn | +4 | +4 | 0 |
| $M^1$ = {Ni, Mn, Co, Fe} | +2 | +4 | 2 |
| $M^2$ = {Si, Ti} | +4 | +4 | 0 |
| $M^2$ = Mo | +3 or +4 | +6 | 2 or 3 |

In the compound according to the invention, the ratio between the number of lithium atoms and the number of atoms of electrochemically active elements is preferentially at least equal to 2. This high ratio gives the possibility of obtaining a high capacity. Indeed, as this was explained in the paragraph on the prior art, lithium is removed from the structure of the compound during the charging process. In order to retain electroneutrality of the compound, removal of lithium is compensated by an increase in the degree of oxidation of the electrochemically active element(s). In the compound according to the invention, the removal of lithium does not end when the electrochemically active element(s) has(have) attained their maximum degree of oxidation, i.e. they cannot lose electrons any longer. It continues because the compound contains in the discharged condition an excess of lithium relatively to the amount of electrochemically active elements. In order to retain electroneutrality of the compound, removal of the lithium still present in the compound after the electrochemically active elements have attained their maximum degree of oxidation is compensated by oxidation of the $O^{2-}$ ions which are at least partly transformed into gaseous oxygen $O_2$. Thus the amount of lithium which may be removed from the compound during the charging process (therefore the amount of electrons which the compound may release during charging) is not limited by the amount of the electrochemically active elements (Ni, Mn, Co, Fe and Mo). Without intending to be bound by theory, the applicant believes that the loss of oxygen atoms generates voids in the structure of the compound thereby giving the possibility of obtaining a high discharge capacity.

The compound may be synthesized by mechanosynthesis by mixing under an inert atmosphere the precursors in the desired stoichiometric amounts, and then by milling the mixture by means of a ball milling machine. By mechanosynthesis is meant the whole of the material techniques in which the activation energy of the chemical reaction between the precursors is provided by mechanical means. It is also possible to contemplate the synthesis of the compound by sol-gel techniques by adapting the precursors.

The composition of the synthesized compound may be determined by scanning electron microscopy (SEM) coupled with energy dispersion x-ray spectrometry (EDS), by X fluorescence and by x-ray diffraction analysis (XRD). X-ray diffraction analysis gives the possibility of determining whether the compound comprises a single crystalline phase (single-phase material) or several crystalline phases (multi-phase material). This technique also gives the possibility of determining the nature of these phases. According to the first object of the invention, the compound contains a phase for which the crystallographic structure may be refined in a cubic or lamellar crystallographic structure. A lamellar structure is a structure of the $NaFeO_2$ type, of space group R-3M. The presence of a phase crystallizing in the cubic or lamellar system is expressed by the appearance of an x-ray diffraction peak located at an angle of $2\theta$ comprised between 40 and 50°, generally between 42 and 47°, preferably between 43 and 45°, for a wavelength corresponding to the $K\alpha$ line of copper. The intensity of the other diffraction spectrum peaks generally represents less than 30%, preferably less than 20%, still preferably less than 10% of the height of the main peak located between 40 and 50°. The crystalline structures of cubic or lamellar forms may be obtained by preparing the material by mechanosynthesis followed by an optional heat treatment.

In a preferred embodiment, the compound does not include any phase crystallizing in the orthorhombic system.

After having synthesized one of the compounds as described herein before, carbon is preferably added to the obtained compound, for example in the form of active coal or carbon black. The mixture is then milled in order to obtain a composite material, i.e. an assembly of carbon and of the compound according to the invention having strong adhesion capability between each other. The carbon percentage is generally less than 20% by weight based on the weight of the composite material. Preferably, it is comprised between 1 and 10%, still preferably about 5%.

Preferably, the composite material is subject to an annealing step under an inert gas at a temperature of less than or equal to 700° C., preferably between 350° C. and 450° C., for example at 400° C. In the case when the compound according to the invention is not mixed with carbon, the annealing step is carried out at a temperature of less than 700° C., preferably between 350° C. and 450° C., for example 400° C. The annealing gives the possibility of promoting the formation of crystalline phases.

The object of the present invention is also a positive electrode of a lithium battery containing as an electrochemically active material, the compound or the composite material as described earlier. The electrode according to the invention consists of a conductive support being used as a current collector which is coated with a layer containing the electrochemically active material according to the invention and further comprising a binder and a conductive material.

The current collector is preferably a two-dimensional conductive support such as a solid or perforated sheet, based on carbon or metal, for example in nickel, steel, stainless steel or aluminium.

The binder may contain one or several of the following components: polyvinylidene fluoride (PVdF) and its copolymers, polytetrafluoroethylene (PTFE), polyacrylonitrile (PAN), polymethyl or polybutyl methacrylate, polyvinyl chloride (PVC), polyvinylformaldehyde, polyesters and amide block polyethers, polymers of acrylic acid, methacrylic acid, acrylamide, itaconic acid, sulfonic acid, elastomers and cellulose compounds.

From among the elastomers which may be used, mention may be made of ethylene/propylene/diene terpolymers (EPDM), styrene/butadiene copolymers (SBR), acrylonitrile/butadiene copolymers (NBR), styrene/butadiene/styrene block copolymers (SBS) or styrene/acrylonitrile/styrene block copolymers (SIS), styrene/ethylene/butylene/styrene copolymers (SEBS), styrene/butadiene/vinylpyridine terpolymers (SBVR), polyurethanes (PU), neoprenes, polyisobutylenes (PIB), butyl rubbers and mixtures thereof.

The cellulose compound may be a carboxymethylcellulose (CMC), a hydroxypropylmethylcellulose (HPMC), a hydroxypropylcellulose (HPC) or a hydroxyethylcellulose (HEC).

The conductive material is selected from graphite, carbon black, acetylene black (AB), soot or one of their mixtures.

The object of present invention is further a lithium battery comprising a positive electrode containing the compound or the composite material as described earlier. The battery according to the invention further comprises at least one negative electrode, at least one separator and an electrolyte.

The negative electrode consists of a conductive support used as a current collector which is coated with a layer containing the electrochemically active material and further comprising a binder and a conductive material. The electrochemically active material is capable of inserting lithium into its structure. It may be selected from lithium compounds, a carbonaceous material which may insert lithium into its structure like graphite, coke, carbon black and glassy carbon, and a mixed oxide of lithium and of a transition metal such as nickel, cobalt or titanium. It may also contain tin, silicon, compounds based on carbon and silicon, compounds based on carbon and tin and compounds based on carbon, tin and silicon and a titanium oxide such as $Li_4Ti_5O_{12}$. It may comprise silicon, the surface of which is grafted with an organic group as described in document EP-A-2 242 129. It may comprise a Si C nanomaterial as described in document FR-A-2 885 734. The anodes used may also consist of oxides, nitrides or phosphides of transition metals.

The electrolyte is selected from a non-aqueous liquid electrolyte including a lithium salt dissolved in a solvent and an ion-conducting solid polymer electrolyte for lithium ions, such as for example polyethylene oxide (PEO).

The lithium salt is selected from lithium perchlorate $LiClO_4$, lithium hexafluorophosphate $LiPF_6$, lithium tetrafluoroborate $LiBF_4$, lithium trifluoromethanesulfonate LiCF$_3$SO$_3$, lithium bis(fluorosulfonyl)imide Li(FSO$_2$)$_2$N (LiFSI), lithium trifluoromethanesulfonimide LiN(CF$_3$SO$_2$)$_2$ (LiTFSI), lithium trifluoromethane-sulfonemethide LiC(CF$_3$SO$_2$)$_3$ (LiTFSM), lithium bisperfluoroethylsulfonimide LiN(C$_2$F$_5$SO$_2$)$_2$ (LiBETI), lithium 4,5-dicyano-2-(trifluoromethyl) imidazolide (LiTDI), lithium bis(oxalatoborate) (LiBOB), lithium tris(pentafluoroethyl) trifluorophosphate LiPF$_3$(CF$_2$CF$_3$)$_3$ (LiFAP) and mixtures of the previous ones.

Preferably, the solvent is a solvent or a mixture of solvents selected from customary organic solvents notably saturated cyclic carbonates, unsaturated cyclic carbonates, non-cyclic carbonates, alkyl esters, like formates, acetates, propionates or butyrates, ethers, lactones such as gamma-butyrolactone, tetrahydrothiofene bioxide, nitrile solvents, and mixtures thereof. From among the saturated cyclic carbonates, mention may for example be made of ethylene carbonate (EC), fluoroethylene carbonate (FEC), propylene carbonate (PC), butylene carbonate (BC), and mixtures thereof. From among unsaturated cyclic carbonates, mention may for example be made of vinylene carbonate (VC), its derivatives and mixtures thereof. From among non-cyclic carbonates, mention may for example be made of dimethyl carbonate (DMC), diethyl carbonate (DEC), ethyl methyl carbonate (EMC), dipropyl carbonate (DPC) and mixtures thereof. From among alkyl esters, mention may for example be made of methyl acetate, ethyl acetate, methyl propionate, ethyl propionate, butyl propionate, methyl butyrate, ethyl butyrate, propyl butyrate and mixtures thereof. From among ethers, mention may for example be made of dimethyl ether (DME) or diethyl ether (DEE), and mixtures thereof.

The separator may consist of a layer of polypropylene (PP), polyethylene (PE), polytetrafluoroethylene (PTFE), polyacrylonitrile (PAN), polyethylene-terephthalate (PET) or a mixture of layers of different natures. The mentioned polymers may be coated with a ceramic layer.

EXAMPLES

Preparation of the Samples:

The materials were synthesized from the following precursors: MnO$_2$, MnO, NiO, SiO$_2$, Li$_2$O, TiO$_2$, MoO$_2$ and Mo°.

The synthesis was carried out via a mechanical route by means of a planetary milling machine of the Ago 2 type. The different precursors were introduced in stoichiometric amounts in a stainless steel jar with a glove box under argon. 200 g of stainless steel balls were added to the 5 g of mixture. Mechanosynthesis was carried out at a speed of rotation of 900 rpm for 30 min. After mechanical treatment, the jar was opened in the glove box under argon and 5% by weight of active coal (Mellinckrodt Baker, Inc.) was added. A second milling was then achieved at 900 rpm for 5 min. The obtained composite was then heat-treated between 400° C. and 700° C. with circulation of argon for 4 h. Examples of compositions according to the invention are summarized in Table 2 below.

Figure 3:
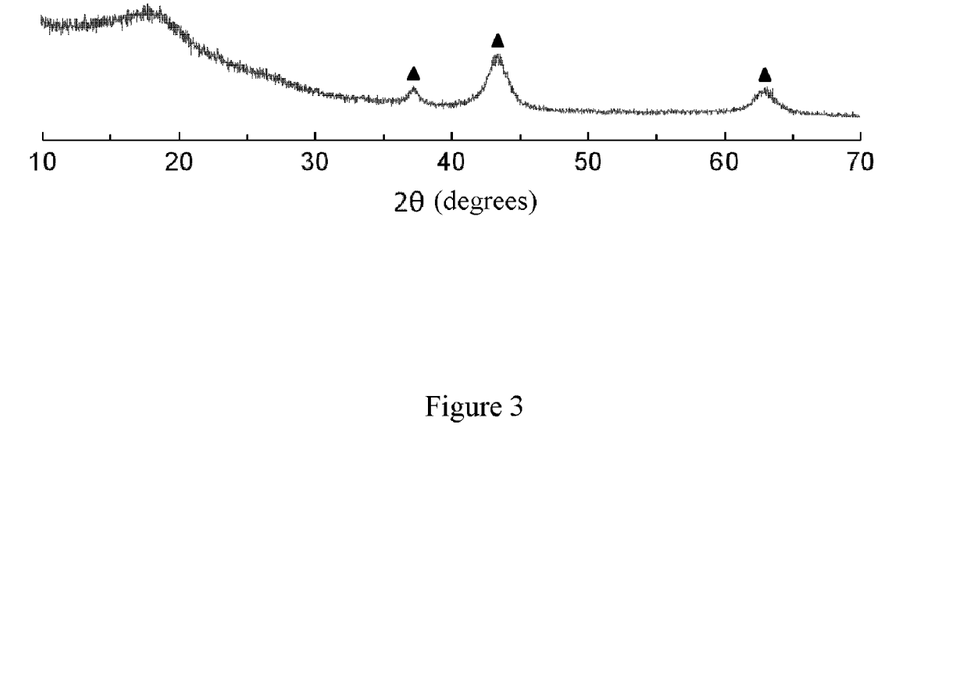
FIG. 3 illustrates the x-ray diffraction spectrum of a mixture comprising the compound of Example 1 and 5% by weight of carbon. The compound of Example 1 was obtained after 30 minutes of mechanosynthesis. The mixture was obtained after milling for 5 minutes the compound of Example 1 with carbon.
Figure 4:
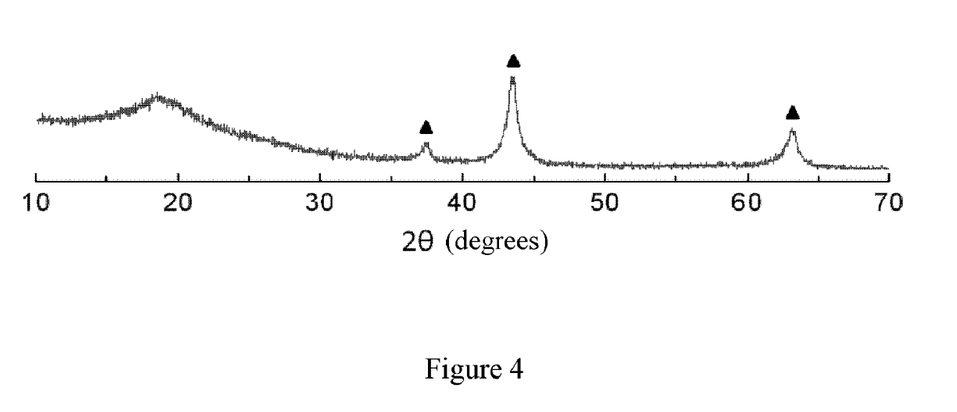
FIG. 4 illustrates the x-ray diffraction spectrum of a mixture comprising the compound of Example 4 and 5% by weight of carbon. The compound of Example 4 was obtained after 30 minutes of mechanosynthesis. The mixture was obtained after milling for 5 minutes the compound of example 4 with carbon, followed by a heat treatment at 400° C. under argon.

X-ray diffraction analyses were conducted by means of a diffractometer Bruker D8 Advance by using the Kα line of Cu. As an example, FIGS. 3 and 4 respectively represent the x-ray diffraction spectra of the compounds of Examples 1 and 4. The diffraction diagrams corresponding to these examples were able to be indexed in a cubic structure which may be transformed into a lamellar structure after heat treatment at a higher temperature.

TABLE 2

| Ex. no. | | M$^1$ | M$^2$ | a | b | x | n | c = 4 + a + n.b + x/2 |
|---|---|---|---|---|---|---|---|---|
| 1 | Li$_4$Mn$_2$O$_5$ | Mn | | 1 | 0 | 0 | | 5.00 |
| 2 | Li$_4$MnNiO$_5$ | Ni | | 1 | 0 | 0 | | 5.00 |
| 3 | Li$_4$MnCoO$_5$ | Co | | 1 | 0 | 0 | | 5.00 |
| 4 | Li$_4$MnNi$_{0.5}$Mo$_{0.5}$O$_{5.5}$ | Ni | Mo | 0.5 | 0.5 | 0 | 2 | 5.50 |
| 5 | Li$_4$MnCo$_{0.5}$Mo$_{0.5}$O$_{5.5}$ | Co | Mo | 0.5 | 0.5 | 0 | 2 | 5.50 |
| 6 | Li$_4$MnNi$_{0.5}$Ti$_{0.5}$O$_{5.5}$ | Ni | Ti | 0.5 | 0.5 | 0 | 2 | 5.50 |
| 7 | Li$_4$Mn$_2$AlO$_{6.5}$ | Mn | Al | 1 | 1 | 0 | 1.5 | 6.5 |
| 8 | Li$_3$Mn$_{1.5}$O$_4$ | Mn | | 0.5 | 0 | −1 | | 4 |
| 9 | Li$_{6.6}$Mn$_{1.8}$Mo$_{1.5}$O$_{9.1}$ | Mn | Mo | 0.8 | 1.5 | 2.6 | 2 | 9.1 |
| 10 | Li$_7$Mn$_{3.5}$O$_8$ | Mn | | 2.5 | 0 | 3 | | 8 |

The electrochemical performances were measured from a mixture of composite with 28% of carbon black (Super P from Timcal). This composite was then tested in a half-cell (for example in a button battery) by using lithium metal as a counter-electrode. The electrolyte consists of an EC:DMC mixture and of a LiPF$_6$ salt with a concentration of 1 M.

Figure 5:
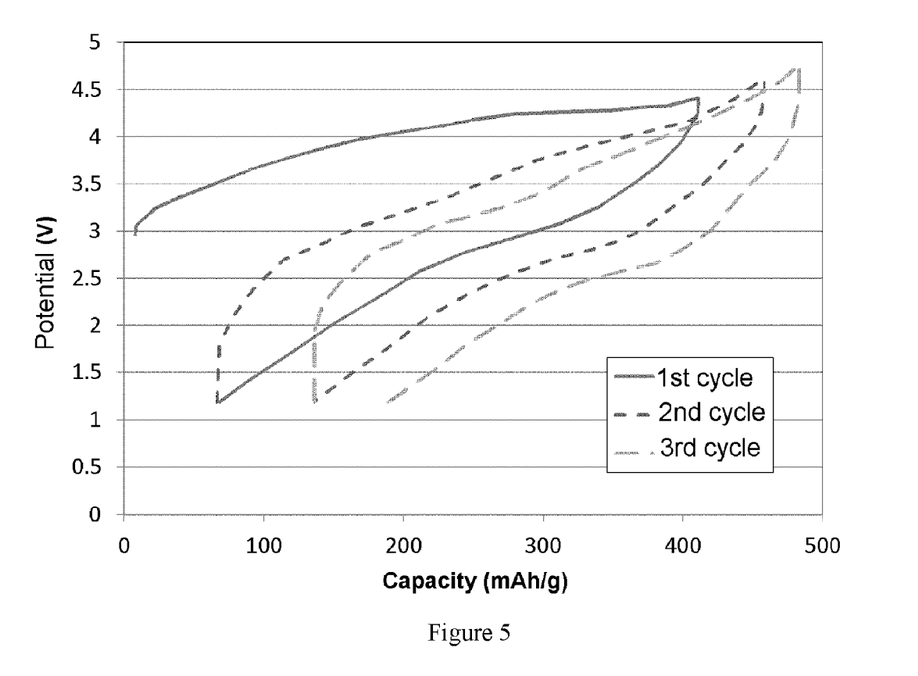
FIG. 5 illustrates the charging-discharging curves of the compound of example 4 after having mixed the latter with 5% by weight of carbon and treated at 400° C. $1^{st}$ charging: cut-off voltage: 4.4 V; $2^{nd}$ charging: cut-off voltage: 4.6 V; $3^{rd}$ charging: cut-off voltage: 4.8 V.

The cycles were carried out between 1.2 V and 4.8 V at a rate of C/20. FIG. 5 illustrates the charging-discharging curves of the compound of Example 4 after having mixed the latter with 5% by weight of carbon and having treated it at 400° C. 1$^{st}$ charging: cut-off voltage: 4.4 V; 2$^{nd}$ charging: cut-off voltage 4.6 V; 3$^{rd}$ charging: cut-off voltage 4.8 V. The mass capacity values measured during discharging were copied into the last column of Table 3.

TABLE 3

| Example no. | | I | II | III | IV | V | VI | VII | VIII | IX |
|---|---|---|---|---|---|---|---|---|---|---|
| 1 | Li$_4$Mn$_2$O$_5$ | 2 | 4 | 4 | 493 | 1952 | 490 | 1940 | 370 | 1465 |
| 2 | Li$_4$MnNiO$_5$ | 2 | 4 | 4 | 484 | 1970 | 430 | 1743 | 290 | 1176 |
| 3 | Li$_4$MnCoO$_5$ | 2 | 4 | 4 | 484 | 1966 | 401 | 1660 | 300 | 1242 |
| 4 | Li$_4$MnNi$_{0.5}$Mo$_{0.5}$O$_{5.5}$ | 2 | 4 | 4 | 432 | 1809 | 400 | 1671 | 320 | 1337 |
| 5 | Li$_4$MnCo$_{0.5}$Mo$_{0.5}$O$_{5.5}$ | 2 | 4 | 4 | 432 | 1807 | 430 | 1811 | 290 | 1221 |
| 6 | Li$_4$MnNi$_{0.5}$Ti$_{0.5}$O$_{5.5}$ | 1 | 4 | 3 | 359 | 1580 | 430 | 1618 | 240 | 903 |
| 7 | *Li$_4$Mn$_2$AlO$_{6.5}$ | 2 | 4 | 4 | 399 | 1527 | | | | |

TABLE 3-continued

| Example no. | | I | II | III | IV | V | VI | VII | VIII | IX |
|---|---|---|---|---|---|---|---|---|---|---|
| 8 | *$Li_3Mn_{1.5}O_4$ | 1 | 3 | 3 | 480 | 1855 | | | | |
| 9 | *$Li_{6.6}Mn_{1.8}Mo_{1.5}O_{9.1}$ | 4.6 | 6.6 | 6.6 | 407 | 1790 | | | | |
| 10 | *$Li_7Mn_{3.5}O_8$ | 5 | 7 | 7 | 509 | 2092 | | | | |

*Compositions for which the capacity was not measured
I: Number of exchangeable electrons in the 1st charging process by $M^1$ and $M^2$ per formula
II: Number of exchangeable lithium atoms during the 1st charging process
III: Number of exchangeable electrons during discharging; this number cannot be greater than the number of exchangeable lithium atoms during charging
IV: Theoretical discharging mass capacity (mAh/g)
V: Theoretical discharging volume capacity (mAh/cm$^3$)
VI: Charging capacity measured for charging up to 4.8 V (mAh/g)
VII: Measured charging capacity (mAh/cm$^3$)
VIII: Discharging mass capacity measured at the cut-off voltage of 1.2 V (mAh/g)
IX: Discharging volume capacity measured at the cut-off voltage of 1.2 V (mAh/cm$^3$)

The calculation of the theoretical capacity will now be detailed by taking as an example, compound 1. In the compound $Li_4Mn_2O_5$, the manganese is globally in an average degree of oxidation of +3. During the first charging process, both manganese atoms will oxidize to the degree of oxidation +4 thus globally exchanging two electrons. As explained hereinbefore, the charge is not limited by the number of exchangeable electrons by the electrochemically active elements. Removal of the lithium is therefore not stopped when the whole of the manganese has attained the degree of oxidation of +4. It continues which allows removal of the 4 lithium atoms. This removal is possible by oxidation of the oxygen which probably passes from the degree of oxidation (−2) to the degree of oxidation (0) as this was already observed in the literature. The compound $Li_4Mn_2O_5$ may therefore remove 4 lithium atoms, which corresponds to 4 electrons. The theoretical chargeable capacity of this compound is therefore 4×26,802 mAh/molar mass of $Li_4Mn_2O_5$=493 mAh/g wherein 26,802 mAh represents the amount of electricity corresponding to the flow of a mole of electrons for a period of one hour. This capacity may then be theoretically discharged by reducing both manganese atoms from the degree of oxidation +4 to the degree of oxidation +2, i.e. a total of 4 electrons per formula.

Table 4 below compares the theoretical capacity of the compound of Example 1 according to the invention with that of compounds according to the prior art. It is seen that they are higher for the compound of Example 1.

TABLE 4

| | $Li_4Mn_2O_5$ Ex. 1 according to the invention | $Li_2MnO_3$ according to the prior art | $xLi_2MnO_3$; (1 − x)$LiMnO_2$ according to the prior art | | | | |
|---|---|---|---|---|---|---|---|
| | | | x | | | | |
| | | | 0 | 0.2 | 0.4 | 0.6 | 0.8 |
| Theoretical mass capacity (mAh/g) | 493 | 459 | 244 | 289 | 333 | 376 | 418 |
| Theoretical volume capacity (mAh/cm$^3$) | 1952 | 1622 | 830 | 992 | 1151 | 1310 | 1466 |

The compound of Example 1 according to the invention also has the following advantages as compared with $Li_2MnO_3$:

it has a reduced risk of reactivity towards the electrolyte. Indeed, during charging, oxygen ($O_2$) gas evolvement of produced by $Li_4Mn_2O_5$ is less than in the case of $Li_2MnO_3$;

it is more lightweight than $Li_2MnO_3$;

the number of oxygen atoms per electrochemically active atom in $Li_4Mn_2O_5$ is reduced by 0.5 as compared with $Li_2MnO_3$, which allows a significant increase in the volume capacity of $Li_4Mn_2O_5$; the volume of the anions being actually much greater than that of the cations.

The invention claimed is:

1. A compound of formula $Li_{4+x}MnM^1_aM^2_bO_c$
wherein:
   $M^1$ is selected from the group consisting in Ni, Mn, Co, Fe and a mixture thereof;
   $M^2$ is selected from the group consisting in Si, Ti, Mo, B, Al and a mixture thereof;
with:
   $-1.2 \leq x \leq 3$;
   $0 < a \leq 2.5$;
   $0 < b \leq 1.5$;
   $4.3 \leq c \leq 10$; and
   $c = 4 + a + (n \cdot b) + x/2$
wherein:
   n=2 when $M^2$ is selected from the group consisting in Si, Ti, Mo or a mixture thereof; and
   n=1.5 when $M^2$ is selected from the group consisting in B, Al or a mixture thereof.

2. The compound according to claim 1, wherein $0 < x \leq 2$.
3. The compound according to claim 1, wherein $0.5 \leq a \leq 1$.
4. The compound according to claim 1, wherein $0 < b \leq 0.5$.
5. The compound according to claim 1, wherein $5 \leq c \leq 7$.
6. The compound according to claim 1 not containing any molybdenum.
7. A composite material comprising the compound according to claim 1 and carbon in a mass percentage of less than 20% by weight based on the weight of the composite material.

8. A battery of the lithium-ion type comprising a positive electrode comprising the composite material according to claim 7.

9. A battery of the lithium-ion type comprising a positive electrode comprising the compound according to claim 1.

* * * * *